US012712746B2

(12) United States Patent
Ferenczi

(10) Patent No.: US 12,712,746 B2
(45) Date of Patent: Aug. 18, 2026

(54) AUTOMATED AUTHENTICATION BASED ON SHARED DATA

(71) Applicant: American Express Travel Related Services Company, Inc., New York, NY (US)

(72) Inventor: Andras L. Ferenczi, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 10 days.

(21) Appl. No.: 18/368,232

(22) Filed: Sep. 14, 2023

(65) Prior Publication Data

US 2025/0097054 A1 Mar. 20, 2025

(51) Int. Cl.
*H04L 9/32* (2006.01)
*H04L 9/40* (2022.01)

(52) U.S. Cl.
CPC .......... *H04L 9/3271* (2013.01); *H04L 63/083* (2013.01)

(58) Field of Classification Search
CPC ...... H04L 63/08; H04L 9/3271; H04L 63/083
USPC .......................................................... 713/168
See application file for complete search history.

(56) References Cited

U.S. PATENT DOCUMENTS

| | | | | |
|---|---|---|---|---|
| 11,327,960 | B1 * | 5/2022 | Jin | G06F 16/2468 |
| 12,169,500 | B1 * | 12/2024 | Sun | G06F 40/205 |
| 2024/0061644 | A1 * | 2/2024 | Parthasarathi | G06F 21/32 |
| 2024/0354176 | A1 * | 10/2024 | Sampath | G06F 9/546 |
| 2025/0077635 | A1 * | 3/2025 | Mazumder | G06F 21/32 |

OTHER PUBLICATIONS

Machine Generated Text: A Comprehensive Survey of Threat Models and Detection Methods, Crothers et al, Oct. 2022 (Year: 2022).*

* cited by examiner

*Primary Examiner* — Jahangir Kabir
(74) *Attorney, Agent, or Firm* — Thomas | Horstemeyer, LLP

(57) ABSTRACT

Disclosed are various approaches for using generative large language models (LLMs) and a shared text corpus to facilitate automated in-depth authentication of a user. A private text corpus can be shared between the user account and a verification entity. At least one authentication prompt can be generated using a large language model trained at least in part on the private text corpus. At least one authentication prompt can be sent to an authentication agent associated with the user. The authentication agent can send an authentication response based at least in part on the at least one authentication prompt and the private text corpus. The authentication response can be verified based at least in part on the private text corpus.

20 Claims, 6 Drawing Sheets

AUTOMATED AUTHENTICATION BASED ON SHARED DATA

BACKGROUND

Two parties may engage in a transaction or seek to establish a relationship with each other. These parties may share information with each other to accomplish their goals. In some situations, the first party may wish to verify the second party's identity. This can be accomplished by asking the second party to provide information. This information can relate to something known by the second party, something possessed by the second party, or something inherent to the second party. Once the second party provides information in response to the first party's inquiry, the first party must either trust the information provided or perform additional verification steps to ensure that the response is accurate.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
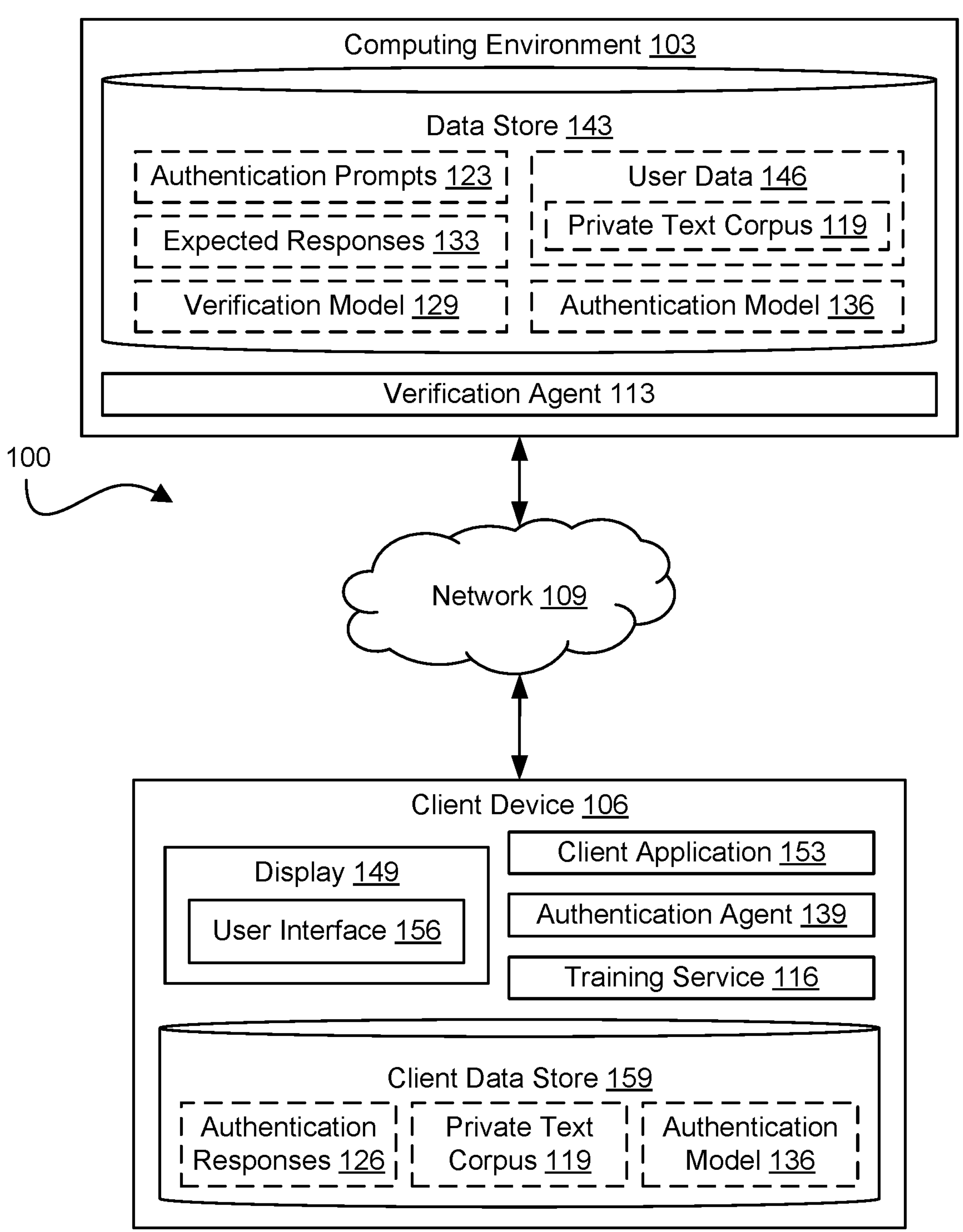
FIG. 1 is a drawing of a network environment according to various embodiments of the present disclosure.

Disclosed are various approaches for using generative large language models (LLMs) and a shared text corpus to facilitate automated in-depth authentication of a user. Often, circumstances arise in which an entity wishes to conduct an in-depth authentication of a user. For example, a credit bureau may ask a user to provide personal information such as a full name, date of birth, Social Security number, and current address. The credit bureau then uses this information to verify a user's identity. In another example, when creating an account on a website, a user may be asked to provide answers to a series of secret questions. The purpose of these questions is to provide an additional layer of security when logging back into the account or accessing the account from a new device or location. However, the process of entering a username and/or password followed by responding to numerous security questions having obscure or difficult-to-remember answers is time-consuming, challenging, and inconvenient for the user. Additionally, since this process is often reliant on human memory alone, it can be highly error-prone, often with little recourse for providing an accidentally incorrect answer.

In contrast to other approaches involving time-consuming entry of responses reliant on human memory, the approaches herein use generative LLMs to conduct automated authentication based at least in part on a shared body of text which is known to both parties. In various examples, an authentication session can be established between a verification agent of an entity (e.g., verifier, inquirer, etc.) and a personalized authentication agent of the user (e.g., credential holder, responder, etc.). In various examples, the verification agent and the authentication agent can use LLMs trained on the same private text corpus to conduct authentication through a series of prompts and responses.

Thus, various embodiments of the present disclosure can save valuable time and resources, as well as enhance security, by automating authentication processes compared to approaches which require the user to personally complete an iterative authentication challenge. By using a shared, private text corpus, the verifier can confirm the responses provided by the user's authentication agent to ensure security. Further, by utilizing generative LLMs, the authentication prompts generated for each authentication session can be varied and new, thereby reducing the likelihood that a malicious actor could predict the prompts and perform a fraudulent authentication. Additionally, the use of generative LLMs to generate responses to prompts eliminates the need for a user to recall and enter answers to the prompts, saving the user time and difficulty.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Referring now to FIG. 1, shown is a network environment 100 according to various embodiments. The network environment 100 can include a computing environment 103, and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a verification agent 113, a training service 116, and other applications, services, processes, systems, engines, or functionality not discussed in detail herein.

The verification agent 113 can be executed to identify a private text corpus 119 shared between a verification entity and a user, generate one or more authentication prompts 123 based at least in part on the private text corpus 119, and verify a client device 106 based at least in part on the authentication prompts 123. For example, the verification agent 113 can initiate a verification of a client device 106 in response to a log-in attempt by a client device 106. The verification agent 113 can identify the user account associated with the client device 106 and identify a private text corpus 119 associated with the user account. Using the private text corpus 119, the verification agent 113 can generate one or more authentication prompts 123 to send to the client device 106. The verification agent 113 can receive and verify one or more authentication responses 126 from the client device 106. Once the client device 106 has been verified, the verification agent 113 can allow the client device 106 to complete the login. In some embodiments, the verification agent 113 uses a verification model 129 to generate the authentication prompts 123. Similarly, the verification agent 113 can use the verification model 129 to generate expected responses 133 based at least in part on the authentication prompts 123 and the private text corpus 119. In some embodiments, the verification agent 113 verifies the received authentication responses 126 by comparing the authentication responses 126 to the expected responses 133.

The training service 116 can be executed to obtain an authentication model 136 and the private text corpus 119, and to train the authentication model 136 using the private text corpus 119. For example, the training service 116 can receive an initiation request from the verification agent 113 or from the client device 106. The training service 116 obtain an authentication model 136 and the private text corpus 119 associated with a user account identified in the initiation request. Next, the training service 116 can use the private text corpus 119 to train and/or fine-tune the authentication model 136. The training service 116 can then incorporate the trained authentication model 136 into an authentication agent 139 to be deployed on the client device 106.

Also, various data is stored in a data store 143 that is accessible to the computing environment 103. The data store 143 can be representative of a plurality of data stores 143 which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store 143. The data stored in the data store 143 is associated with the operation of the various applications or functional entities described below. This data can include user data 146, the private text corpus 119, authentication prompts 123, expected responses 133, the verification model 129, the authentication model 136, and potentially other data.

The user data 146 can represent various information about the user who initiates the verification process with the verification entity. The user data 146 can include account information, a user profile including a username and password, as well as the private text corpus 119, and potentially other data relating to the user. The user data 146 can include data associated with the user that can be used to personalize and train the authentication model 136. In some examples, the user data 146 can include scans and/or images of physical credentials (e.g., licenses, passport, transcripts, etc.), responses to one or more questionnaires designed to obtain information about the user, user-generated summaries, and/or other type of documents and/or inquires that contain information about the user.

The private text corpus 119 can represent a text corpus which is common knowledge only to the verification entity and the user. In some embodiments, the private text corpus 119 is a plurality of financial, medical, and/or legal records shared between the verification entity and the user. For example, the private text corpus 119 could be a transaction history between a financial institution and an account holder, a medical history between a medical facility and a patient, or legal records between a government body and an individual. In some embodiments, the private text corpus 119 is a communication history, such as a series of emails, text messages, chats, or other communications. In other embodiments, the private text corpus 119 is a contract between two parties. The private text corpus 119 can be confidential information, or general information that is generated specifically between the verification entity and the user. In some embodiments, the private text corpus 119 can be converted into a plurality of vector embeddings and saved in a vector database.

Individual authentication prompts 123 can represent natural language inquiries which are based at least in part on the user data 146 and the private text corpus 119. An authentication prompt 123 can be generated by the verification agent 113. In some examples, an authentication prompt 123 can include terms from the private text corpus 119 which are intended to trigger a particular authentication response 126.

Individual expected responses 133 can represent anticipated natural language responses based at least in part on the authentication prompts 123. In some embodiments, an expected response 133 can be generated by the verification agent 113 based at least in part on the authentication prompt 123 and/or one or more parsed terms of the authentication prompt 123. An expected response 133 can serve as a means for the verification agent 113 to verify a received authentication response 126 by comparing the authentication response 126 to the expected response 133.

The verification model 129 can represent a large language model (LLM) that is trained and personalized to generate the authentication prompts 123. Examples of LLMs that could be used for the verification model 129 can include generative pretrained transformer (GPT) models, Bidirectional Encoder Representations from Transformers (BERT) models, and/or any other type of trained model as can be appreciated. The verification model 129 can be trained on the user data 146 and the private text corpus 119 to generate an authentication prompt 123 based at least in part on the user data 146 and the private text corpus 119. In some embodiments, the verification model 129 can be trained to output an authentication prompt 123 in response to an initiation of the verification process. In addition, the verification model 129 can be trained to receive and interpret authentication responses 126.

The authentication model 136 can represent a large language model (LLM) that is trained and personalized to generate the authentication responses 126. Examples of LLMs that could be used for the authentication model 136 can include, generative pretrained transformer (GPT) models, Bidirectional Encoder Representations from Transformers (BERT) models, and/or any other type of trained model as can be appreciated. The authentication model 136 can be trained on the user data 146 and the private text corpus 119 to generate an authentication response 126 based at least in part on the user data 146 and the private text corpus 119. In some embodiments, the authentication model 136 can be trained to output an authentication response 126 in response to an authentication prompt 123. In addition, the verification model 129 can be trained to receive and interpret authentication prompts 123.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display 149 can be a component of the client device 106 or can be connected to the client device 106 through a wired or wireless connection.

The client device 106 can be configured to execute various applications such as a client application 153, an authentication agent 139, a training service 116, or other applications. The client application 153 can be executed in a client device 106 to access network content served up by the computing environment 103 or other servers, thereby rendering or showing a user interface 156 on the display 149. To this end, the client application 153 can include a browser, a dedicated application, or other executable, and the user interface 156 can include a network page, an application screen, or other user mechanism for obtaining user input. The client device 106 can be configured to execute applications beyond the client application 153 such as email applications, social networking applications, word processors, spreadsheets, or other applications.

The authentication agent 139 can be executed to identify a private text corpus 119 shared between a verification entity and a user, receive one or more authentication prompts 123, and generate one or more authentication responses 126 based at least in part on the private text corpus 119 and one or more authentication prompts 123. For example, the authentication agent 139 can include an authentication model 136 that is trained using various user data 146 and/or the private text corpus 119. The authentication agent 139 can receive a verification initiation request. In various examples, the authentication agent 139 can identify the private text corpus 119 associated with the verification entity identified in the verification initiation request. The authentication agent 139 can send an initiation response and receive at least a first authentication prompt 123. Next, the authentication agent 139 parses the authentication prompt 123 and uses the authentication model 136 to generate an authentication response 126. Using the private text corpus 119, the authentication agent 139 can generate one or more authentication responses 126 which correspond to the authentication prompts 123. The authentication agent 139 can send the authentication responses 126 to the verification entity.

In some embodiments, the client device 106 can include a client data store 159. The client data store 159 can represent mass storage or memory in which the client device 106 can store information. The client data store 159 can include the authentication responses 126, the private text corpus 119, the authentication model 136, and other data.

Next, a general description of the operation of the various components of the network environment 100 is provided. Although the following description provides merely an example of the operation of the various components of the network environment 100, other interactions and operations can also be performed by the various embodiments of the present disclosure. More detailed description of the operation of individual components is illustrated in the flowcharts and sequence diagrams of FIGS. 2-6.

To begin, a user may wish to set up an account with a verification entity. The user and the verification entity can share data. In some examples, the verification entity requires the user to provide answers to a variety of questions. In some examples, the verification entity and the user collaborate on a private text corpus 119 (e.g., a legal contract, personal information, email communications, transaction records, etc.). Once the private text corpus 119 is established, the verification entity can prompt the user to set up automatic authentication. The user can request to set up automatic authentication, triggering a training service 116 hosted either by the verification entity or on the client device 106 of the user. The training service 116 can obtain an authentication model 136 and train and/or fine-tune the authentication model 136 on the private text corpus 119. Once the authentication model 136 is trained, the training service 116 can encrypt the authentication model 136 and store the encrypted authentication model 136 on the client device 106. The authentication model 136 can be incorporated into an authentication agent 139 on the client device 106.

Next, a user may wish to log into their account with the verification entity after the account has been set up. After the user has entered their login credentials (e.g., username and password, personalized identification number (PIN), voice command, biometric identification, etc.), a verification agent 113 associated with the verification entity can send an initiation request to the authentication agent 139. In some examples, the authentication agent 139 can request the user to decrypt the authentication model 136 for those implementations where the authentication model 136 is stored in encrypted form when at rest. Once the authentication model 136 has been decrypted, if needed in said implementation, the authentication agent 139 can send an initiation response to the verification agent 113 to begin authentication.

The verification agent 113 can begin authentication by using the verification model 129 to generate a series of authentication prompts 123 based at least in part on the private text corpus 119. The verification agent 113 can use the verification model 129 to generate a series of expected responses 133 based at least in part on the private text corpus 119 and the series of authentication prompts 123. The verification agent 113 can send the series of authentication prompts 123 to the authentication agent 139. Upon receipt of the authentication prompts 123, the authentication agent 139 can use the authentication model 136 to generate a series of authentication responses 126 based at least in part on the private text corpus 119 and the authentication prompts 123. The authentication agent 139 can return a series of authentication responses 126 which correspond to the authentication prompts 123. Upon receipt of the authentication responses 126, the verification agent 113 can verify the authentication responses 126 against the private text corpus 119. In some examples, the verification agent 113 verifies the authentication responses 126 by comparing the authentication responses 126 to the expected responses 133. If verification is successful, the verification agent 113 can allow the user to gain access to their account.

According to various examples, a verification entity may wish to authenticate a user who does not share a private text corpus 119 with the verification entity. In this situation, the verification entity can request that the user provide a substitute authenticator. The substitute authenticator can be an individual or entity who shares one private text corpus 119 with the verification entity, and another private text corpus 119 with the user. The user can provide information about a substitute authenticator, the information identifying the substitute authenticator. Then, the verification agent 113 of the verification entity can send an authentication initiation request to the authentication agent 139 of the substitute authenticator. The substitute authenticator can identify the user from the authentication initiation request and send a new authentication initiation request to the authentication agent 139 of the user. Next, the substitute authenticator can authenticate the user through a series of authentication prompts 123 and authentication responses 126. Once the user has been authenticated by the substitute authenticator, the authentication agent 139 of the substitute authenticator can send an initiation response to the verification agent 113 of the verification entity. Then, the verification agent 113 can authenticate the substitute authenticator through a series of authentication prompts 123 and authentication responses 126. In this manner, the verification agent 113 can authenticate the user through substitute authentication.

Figure 2:
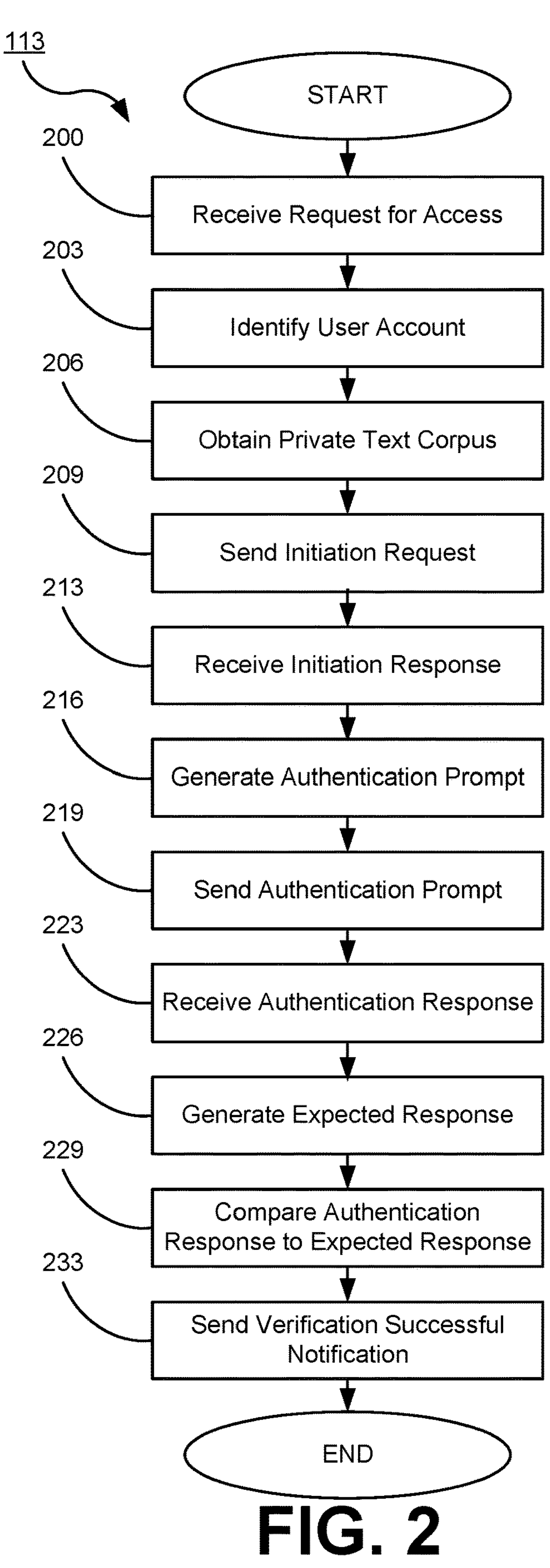
FIG. 2 is a flowchart illustrating examples of functionality implemented as portions of an application executed in a computing environment in the network environment of FIG. 1 according to various embodiments of the present disclosure.

Referring next to FIG. 2, shown is a flowchart that provides one example of the operation of a portion of the verification agent 113. The flowchart of FIG. 2 provides merely an example of the many different types of functional arrangements that can be employed to implement the operation of the depicted portion of the verification agent 113. As an alternative, the flowchart of FIG. 2 can be viewed as depicting an example of elements of a method implemented within the network environment 100.

Beginning with block 200, the verification agent 113 can be configured to receive a request for access. In some embodiments, the verification agent 113 can receive the request for access from a client device 106 through the network 109. In some embodiments, the verification agent 113 can receive the request for access from a data store 143. In some embodiments, the request for access comprises a submission of user credentials (e.g., username and password, personalized identification number (PIN), voice command, biometric identification, etc.).

At block 203, the verification agent 113 can be configured to identify a user account. The verification agent 113 can use the request for access received at block 200 to identify a user account associated with the request for access. In some embodiments, the verification agent 113 can identify the user account based at least in part on the credentials submitted in the request for access. In some embodiments, the verification agent 113 can identify the user account associated with the client device 106 from which the request was received. The verification agent 113 can identify the user account from among a plurality of user accounts in a data store 143.

At block 206, the verification agent 113 can obtain the private text corpus 119. According to various examples, the verification agent 113 can obtain the private text corpus 119 from a data store 143. In some embodiments, the verification agent 113 can transmit data to and receive data from the client device 106 in order to generate the private text corpus 119.

At block 209, the verification agent 113 can be configured to send an initiation request. According to various examples, the initiation request is a prompt sent to an authentication agent 139 on the client device 106 to establish a communication channel between the verification agent 113 and the authentication agent 139. This communication channel can be used to facilitate an interactive authentication session between the verification agent 113 and the authentication agent 139. In some embodiments, the initiation request can include information identifying the verification entity and/or identifying the private text corpus 119 which will be referenced for authentication.

Next, at block 213, the verification agent 113 can be configured to receive an initiation response. The initiation response can be received from the authentication agent 139 on the client device 106. In some embodiments, the initiation response is an indication that the authentication agent 139 is ready to engage in an interactive authentication session.

At block 216, the verification agent 113 can generate an authentication prompt 123. In various examples, the verification agent 113 generates the authentication prompt 123 in response to receiving the initiation response from the authentication agent 139. The verification agent 113 can be configured to generate the authentication prompt 123 using the verification model 129. The authentication prompt 123 is generated by the verification agent 113 based at least in part on the private text corpus 119 and/or other user data 146. In various examples, the authentication prompt 123 can be in the form of a natural language question. The verification agent 113 can be configured to generate multiple authentication prompts 123 at the same time or in sequence, or iteratively generate a new authentication prompt 123 in response to receiving an authentication response 126. In some embodiments, the verification agent 113 can generate a predefined number of authentication prompts 123.

At block 219, the verification agent 113 can be configured to send the authentication prompt 123 generated at block 216. The verification agent 113 can send the authentication prompt 123 over the network 109 to the authentication agent 139 on the client device 106. In some embodiments, the verification agent 113 can send multiple authentication prompts 123 at once or in sequence. In some embodiments, the verification agent 113 can send one authentication prompt 123, and in response to receipt of an authentication response 126, send another authentication prompt 123.

Moving to block 223, the verification agent 113 can be configured to receive an authentication response 126. The verification agent 113 can receive the authentication response 126 from the authentication agent 139 on the client device 106. In some examples, the verification agent 113 can receive the authentication response 126 from another service or device within the networked environment 100. According to various examples, the authentication response 126 is in the form of a natural language message which corresponds to the authentication prompt 123. In some embodiments, the verification agent 113 can receive multiple authentication responses 126 at once or in sequence. In various embodiments, the verification agent 113 can receive one authentication response 126 in response to having sent one authentication prompt 123 at block 223.

At block 226, the verification agent 113 can be configured to generate an expected response 133. According to various examples, the verification agent 113 can generate an expected response 133 in response to generating an authentication prompt 123 as discussed at block 216. The verification agent 113 can generate the expected response 133 based at least in part on the private text corpus 119 and/or the user data 146 by using the verification model 129. In some examples, the expected response 133 can be in the form of a natural language message which corresponds to the authentication prompt 123. The verification agent 113 can be configured to generate multiple expected responses 133 at the same time or in sequence, or iteratively generate a new expected response 133 in response to generating a new authentication prompt 123. The verification agent 113 can generate one or more expected responses 133 per authentication prompt 123.

Next, at block 229, the verification agent 113 can be configured to verify the authentication response 126 by comparing the authentication response 126 to the expected response 133. The verification agent 113 can use the verification model 129 to compare the authentication response 126 received at block 223 to the expected response 133 generated at block 226. In some examples, if the match between authentication response 126 and the expected response 133 surpasses a predefined threshold, the authentication response 126 is verified. According to various examples, once the verification agent 113 has verified a predefined number of authentication responses 126, the user is then verified.

At block 233, the verification agent 113 can be configured to send a verification successful notification. In some embodiments, the verification agent 113 sends the verification successful notification to the authentication agent 139 upon successfully verifying a predefined number of authentication responses 126. In some embodiments, the verification agent 113 sends the verification successful notification to the user interface 156 of a client device 106. After block 233, the process depicted in FIG. 2 ends.

Figure 3:
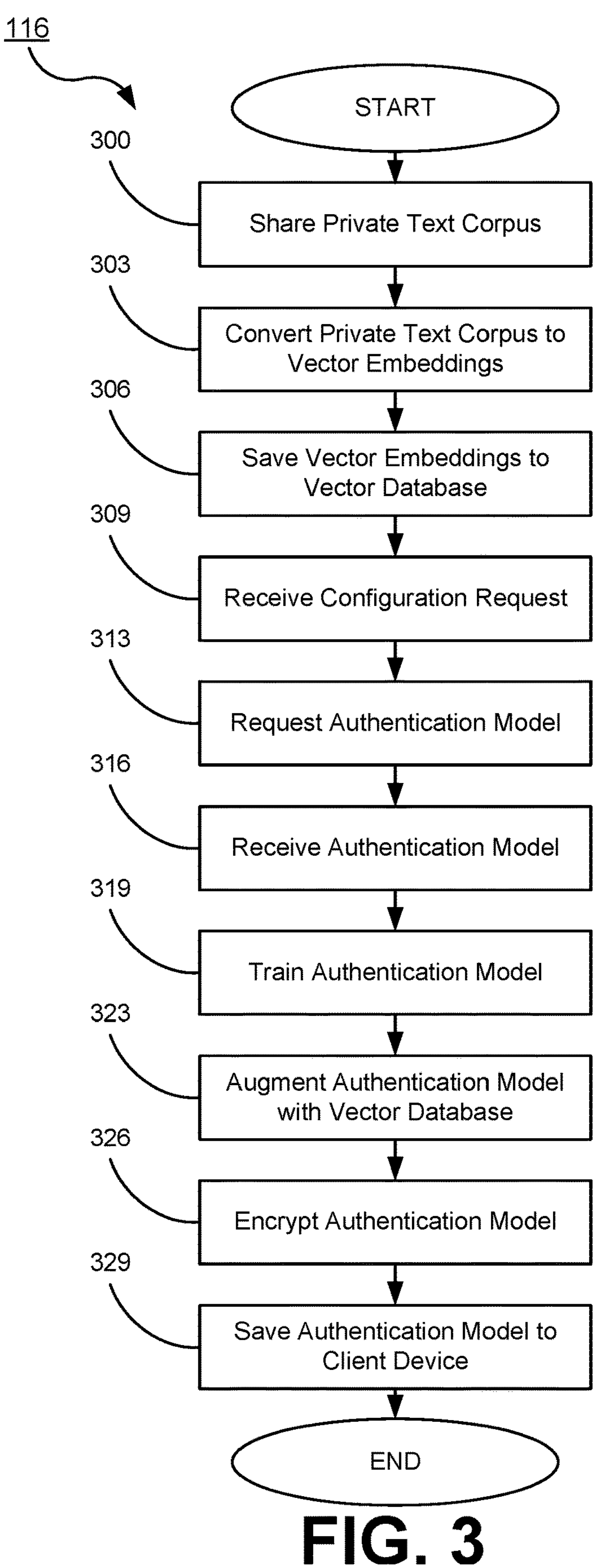
FIG. 3 is a flowchart illustrating examples of functionality implemented as portions of an application executed in a computing environment in the network environment of FIG. 1 according to various embodiments of the present disclosure.

Moving now to FIG. 3, shown is a flowchart that provides one example of the operation of a portion of the training service 116. The flowchart of FIG. 3 provides merely an example of the many different types of functional arrangements that can be employed to implement the operation of the depicted portion of the training service 116. As an alternative, the flowchart of FIG. 3 can be viewed as depicting an example of elements of a method implemented within the network environment 100.

Beginning with block 300, the training service 116 can share a private text corpus 119. In some embodiments, the training service 116 is hosted by the verification entity, and the private text corpus 119 is shared with a client device 106 of a user or other entity. In some embodiments, the training service 116 is hosted on the client device 106 of a user, and the private text corpus 119 is shared with the verification entity. According to various examples, the training service 116 can send and receive data to collaboratively generate the private text corpus 119. In some examples, the training service 116 can obtain the private text corpus 119 from a data store 143 in the computing environment 103. In some examples, the training service 116 can obtain the private text corpus 119 from the client data store 159 on the client device 106.

Next, at block 303, the training service 116 can convert the private text corpus 119 into a plurality of vector embeddings. In some embodiments, the training service 116 can use frequency-based or statistical-based word embedding to convert the private text corpus 119. In some embodiments, the training service 116 can use prediction-based word embedding. According to some examples, the training service 116 can convert the private text corpus 119 using a count vectorizer, a bag-of-words approach, tokenization, N-grams vectorization, term frequency-inverse document frequency (TF-IDF), or other means of vectorization.

Next, at block 306, the training service 116 can be configured to save the vector embeddings generated at block 303 into a vector database. In some examples, the vector database is a part of the data store 143 in the computing environment 103. In some examples, the vector database is a part of the client data store 159 on the client device 106.

At block 309, the training service 116 can receive a configuration request. The training service 116 can receive the configuration request from the client device 106, from the verification entity, or from another device or service in the networked environment 100. The configuration request can serve to establish a communication channel between the training service 116 and the verification agent 113. This communication channel can be used to receive an authentication model 136.

Moving to block 313, the training service 116 can be configured to request an authentication model 136. The training service 116 can request an authentication model 136 from a verification agent 113 associated with the verification entity, a data store 143 in the computing environment 103, a client data store 159 on a client device 106, or from another service, device, data store, or entity within the networked environment 100. In some embodiments, the training service 116 can generate an authentication model 136.

At block 316, the training service 116 can be configured to receive the authentication model 136. According to various examples, the training service 116 can receive the authentication model 136 from a verification agent 113 associated with the verification entity, a data store 143 in the computing environment 103, a client data store 159 on a client device 106, or from another service, device, data store, or entity within the networked environment 100. In some examples, the training service 116 can receive an authentication model 136 that is pre-trained on the private text corpus 119 and/or user data 146. In some examples, the training service 116 can receive a base authentication model 136 which has not been trained on the private text corpus 119 and/or user data 146.

At block 319, the training service 116 can be configured to train and personalize the authentication model 136. The training service 116 can train and/or fine-tune the authentication model 136 based at least in part on the private text corpus 119 and/or user data 146. In some embodiments, the authentication model 136 can be trained to parse an authentication prompt 123 for one or more terms. In various examples, the authentication model 136 can be trained to output an authentication response 126 to an authentication prompt 123 in response to the authentication prompt 123 and/or one or more parsed terms of the authentication prompt 123.

Next, at block 323, the training service 116 can be configured to augment the authentication model 136 with the vector database generated at block 306. In some examples, the authentication model 136 can be trained to access the vector database and use the vector database to generate authentication responses 126 based at least in part on the vector embeddings of the private text corpus 119.

Moving to block 326, the training service 116 can be configured to encrypt the authentication model 136. According to various examples, the training service 116 can request an encryption code (e.g., password, PIN, key, voice command, etc.). In some examples, the training service 116 sends the request for an encryption code to a user interface 156 on the client device 106. In some examples, the training service 116 can receive an encryption code from an input to the user interface 156. The training service 116 can use the encryption code to encrypt the authentication model 136.

At block 329, the training service 116 can be configured to save the authentication model 136 to the client device 106. In some embodiments, the training service 116 can save the encrypted authentication model 136 to the client data store 159 on the client device 106. According to various examples, the training service 116 can incorporate the authentication model 136 into the authentication agent 139 on the client device 106. After block 329, the process depicted in the flowchart of FIG. 3 ends.

Figure 4:
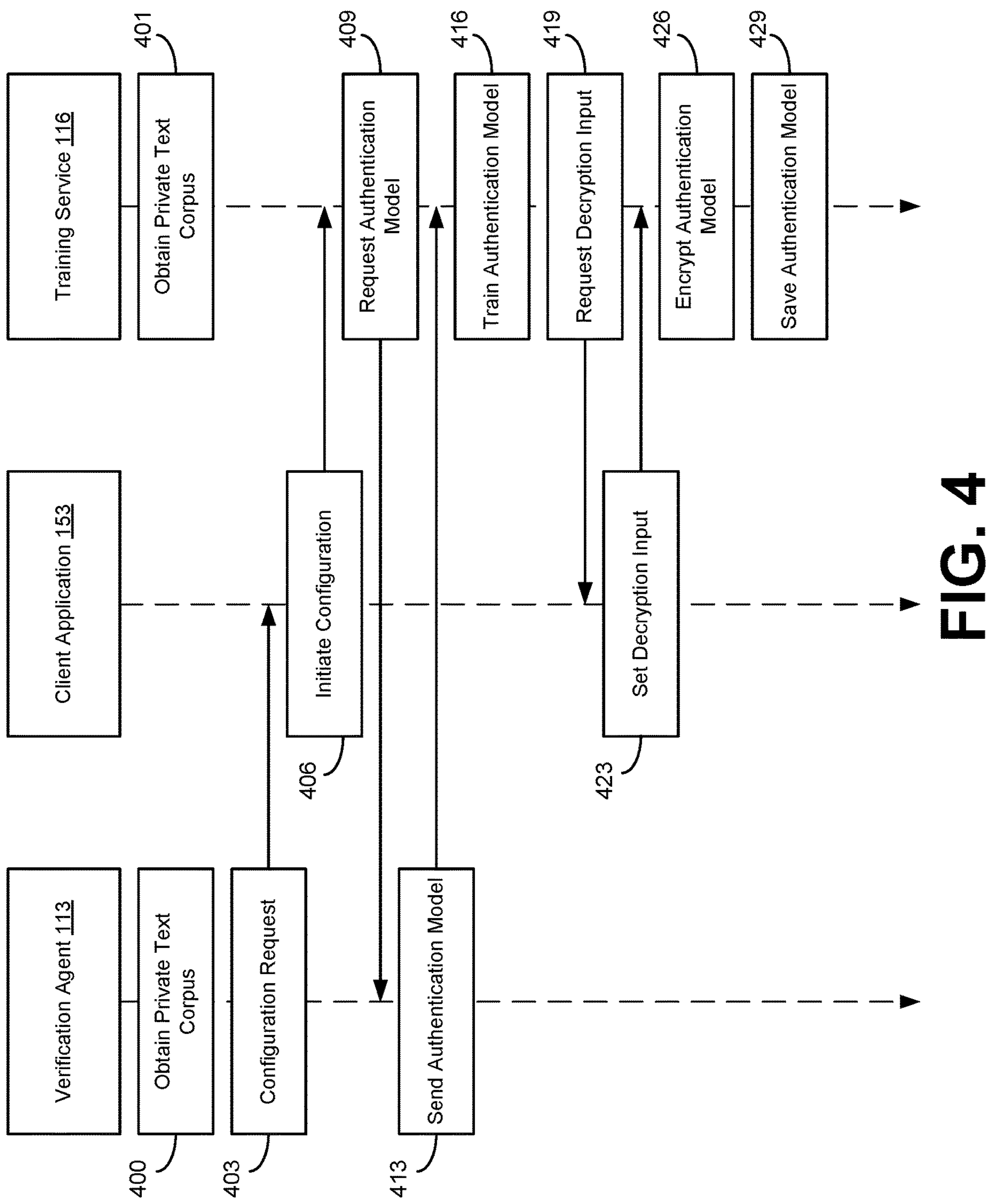
FIG. 4 is a sequence diagram illustrating interactions between various components of the network environment of FIG. 1 according to various embodiments of the present disclosure.

In FIG. 4, shown is a sequence diagram that provides one example of the operation of the interactions between the verification agent 113, the user interface 156, and the training service 116. The sequence diagram of FIG. 4 provides merely an example of the many different types of potential interactions between the verification agent 113, the user interface 156, and the training service 116. As an alternative, the sequence diagram of FIG. 4 can be viewed as depicting an example of elements of a method implemented within the network environment 100.

Beginning with block 400, the verification agent 113 can be configured to obtain the private text corpus 119. According to various embodiments, the verification agent 113 and the training service 116 can collaborate on the private text corpus 119 by sending and receiving data which can be included or otherwise used in generating the private text corpus 119. In various examples, the verification agent 113 can be configured to obtain the private text corpus 119 from a data store 143 in the computing environment 103. In some examples, the verification agent 113 can be configured to obtain the private text corpus 119 from the client data store 159 on the client device 106.

At block 401, the training service 116 can be configured to obtain the private text corpus 119. According to various examples, the training service 116 can obtain the private text corpus 119 by collaborating with the verification agent 113 to generate the private text corpus 119. The training service 116 can be configured to obtain the private text corpus 119 from a data store 143 in the computing environment 103. In some examples, the training service 116 can be configured to obtain the private text corpus 119 from the client data store 159 on the client device 106.

At block 403, the verification agent 113 can send a request to configure the authentication agent 139. According to various examples, the configuration request can serve to establish a communication channel between the verification agent 113 and a service on the client device 106. In some examples, the verification agent 113 can send the configuration request to a user interface 156 in the form of a notification. In some embodiments, the verification agent 113 can send the configuration request to a client application 153, or another service on the client device 106. In some examples, the verification agent 113 can send the configuration request directly to the training service 116.

At block 406, the client application 153 can initiate the configuration. In some examples, the client application 153 initiates configuration of the authentication agent 139. According to various examples, the client application 153 can cause the training service 116 to initiate the configuration of the authentication agent 139.

Next, at block 409, the training service 116 can be configured to request an authentication model 136. The training service 116 can request an authentication model 136 from the verification agent 113. In some examples, the training service 116 can request an authentication model 136 from a data store 143.

At block 413, the verification agent 113 can be configured to send the authentication model 136. According to various examples, the verification agent 113 can send the authentication model 136 to the training service 116. In some examples, the verification agent 113 can send the authentication model 136 to the client application 153 or another service or application on the client device 106. In some examples, the verification agent 113 can send a base authentication model 136 which has not been trained on the private text corpus 119 and/or user data 146. In some embodiments, the verification agent 113 can send an authentication model 136 which has been trained on the private text corpus 119 and/or user data 146.

At block 416, the training service 116 can be configured to train and personalize the authentication model 136. The training service 116 can train and/or fine-tune the authentication model 136 based at least in part on the private text corpus 119 and/or user data 146. In some embodiments, the authentication model 136 can be trained to parse an authentication prompt 123 for one or more terms. In various examples, the authentication model 136 can be trained to output an authentication response 126 to an authentication prompt 123 in response to the authentication prompt 123 and/or one or more parsed terms of the authentication prompt 123.

Next, at block 419, the training service 116 can be configured to request a decryption input (e.g., password, personalized identification number (PIN), key, voice command, etc.). In some examples, the training service 116 sends the request for a decryption code to a user interface 156 on the client device 106. In some embodiments, the training service 116 sends the request for a decryption code to a client application 153 on the client device 106.

At block 423, the client application 153 can be configured to set the decryption input. In some examples, the client application 153 can receive the decryption input from the user interface 156 of a client device 106. In some examples, the client application 153 can send the decryption input to the training service 116.

Moving to block 426, training service 116 can be configured to encrypt the authentication model 136. The training service 116 can encrypt the authentication model 136 such that receipt of the decryption input results in a decryption of the authentication model 136. In some embodiments, the training service 116 encrypts the authentication agent 139 as well as the authentication model 136.

At block 429 the training service 116 can be configured to save the authentication model 136 to the client device 106. In some embodiments, the training service 116 can save the encrypted authentication model 136 to the client data store 159 on the client device 106. According to various examples, the training service 116 can incorporate the authentication model 136 into the authentication agent 139 on the client device 106. After block 429, the process depicted in the sequence diagram of FIG. 4 ends.

Figure 5:
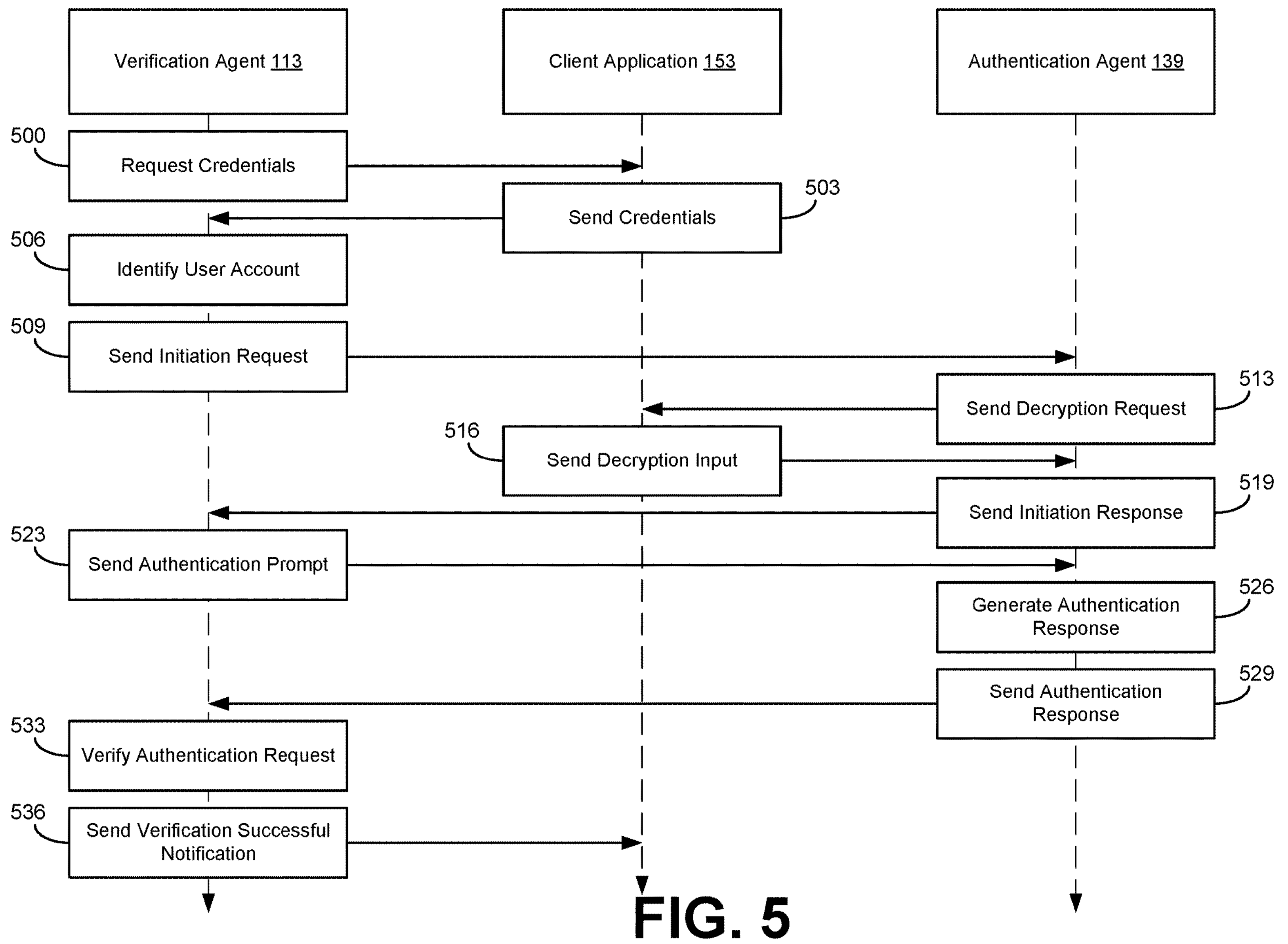
FIG. 5 is a sequence diagram illustrating interactions between various components of the network environment of FIG. 1 according to various embodiments of the present disclosure.

In FIG. 5, shown is a sequence diagram that provides one example of the operation of the interactions between the verification agent 113, the user interface 156, and the authentication agent 139. The sequence diagram of FIG. 5 provides merely an example of the many different types of potential interactions between the verification agent 113, the user interface 156, and the authentication agent 139. As an alternative, the sequence diagram of FIG. 5 can be viewed as depicting an example of elements of a method implemented within the network environment 100.

Beginning with block 500, the verification agent 113 can be configured to request credentials. In some embodiments, the verification agent 113 can send a request for credentials to a client device 106 through the network 109. In some embodiments, the verification agent 113 can send a request for credentials to a client application 153 on a client device 106. According to various examples, the client application 153 can be configured to generate a prompt on the user interface 156 requesting credentials from a user. In some examples, the request for credentials can be sent in response to the verification agent 113 receiving a request for access.

At block 503, the client application 153 can send credentials. According to various examples, the client application 153 can send credentials to the verification agent 113. In some embodiments, the credentials are received by the client application 153 from a user input to the user interface 156. The client application 153, in some examples, can obtain the credentials from a data store 143 or client data store 159 to send to the verification agent 113.

Next, at block 506, the verification agent 113 can be configured to identify a user account. The verification agent 113 can use the credentials sent from the client application 153 at block 503 to identify a user account associated with the credentials. In some embodiments, the verification agent 113 can identify the user account associated with the client device 106 from which the credentials were received. In some examples, the verification agent 113 can identify the user account from among a plurality of user accounts in a data store 143.

At block 509, the verification agent 113 can be configured to send an initiation request. According to various examples, the initiation request is a prompt sent to an authentication agent 139 on the client device 106 to establish a communication channel between the verification agent 113 and the authentication agent 139. This communication channel can be used to facilitate an interactive authentication session between the verification agent 113 and the authentication agent 139. In some embodiments, the initiation request can include information identifying the verification entity and/or identifying the private text corpus 119 which will be referenced for authentication.

Moving to block 513, the authentication agent 139 can be configured to send a decryption request. In some embodiments, the authentication agent 139 can be configured to send the decryption request to a client application 153 on the client device 106. According to various examples, the client application 153 can convert the decryption request to a prompt sent to a user interface 156 requesting a decryption input from the user. In some embodiments, the authentication agent 139 sends the decryption request to the user interface 156.

At block 516, the client application 153 can be configured to send a decryption input. The client application 153 can send the decryption input to the authentication agent 139 in response to receiving the decryption request. In some examples, the client application 153 can obtain the decryption input from a user interface 156, a data store 143, a client data store 159, or another service, data store, or device in the networked environment 100.

At block 519, the authentication agent 139 can be configured to send an initiation response. According to various examples, the authentication agent 139 can be configured to send the initiation response to the verification agent 113 in response to receiving the decryption input. In some examples, the authentication agent 139 can send the initiation response to the verification agent 113 in response to receiving the initiation request sent at block 509. The initiation response can comprise an indication that the authentication agent 139 is ready to engage in an authentication process.

Next, at block 523, the verification agent 113 can send an authentication prompt 123. In some embodiments, the verification agent 113 can generate the authentication prompt 123 using a verification model 129. The authentication prompt 123 can be generated by the verification agent 113 based at least in part on the private text corpus 119 and/or other user data 146. In various examples, the authentication prompt 123 can be in the form of a natural language question. The verification agent 113 can send the authentication prompt 123 to the authentication agent 139 on the client device 106. In some embodiments, the verification agent 113 can send multiple authentication prompts 123 at once or in sequence. In some embodiments, the verification agent 113 can send one authentication prompt 123, and in response to receipt of an authentication response 126, send another authentication prompt 123.

At block 526, the authentication agent 139 can generate an authentication response 126. In various examples, the authentication agent 139 can generate the authentication response 126 in response to receiving the authentication prompt 123 from the verification agent 113. The authentication agent 139 can be configured to generate the authentication response 126 using the authentication model 136. The authentication response 126 can be generated by the authentication agent 139 based at least in part on the private text corpus 119 and/or other user data 146. In various examples, the authentication response 126 can be in the form of a natural language answer. The authentication agent 139 can be configured to generate multiple authentication responses 126 at the same time, in sequence, or iteratively generate a new authentication response 126 in response to receiving a new authentication prompt 123.

Moving to block 529, the authentication agent 139 can be configured to send the authentication response 126 generated at block 519. The authentication agent 139 can send the authentication response 126 over the network 109 to the verification agent 113. In some embodiments, the authentication agent 139 can send multiple authentication responses 126 at once or in sequence. The authentication agent 139 can be configured to send multiple authentication responses 126 at the same time, in sequence, or can iteratively send a new authentication response 126 in response to receiving a new authentication prompt 123.

At block 533, the verification agent 113 can be configured to verify the authentication response 126 by comparing the authentication response 126 to an expected response 133. According to various examples, the verification agent 113 can generate an expected response 133 in response to generating an authentication prompt 123 as discussed at block 216. The verification agent 113 can generate the expected response 133 based at least in part on the private text corpus 119 and/or the user data 146 by using the verification model 129. The verification agent 113 can use the verification model 129 to compare the authentication response 126 to the expected response 133. In some examples, if the match between authentication response 126 and the expected response 133 surpasses a predefined threshold, the authentication response 126 is verified. According to various examples, once the verification agent 113 has verified a predefined number of authentication responses 126, the user is then verified.

At block 536, the verification agent 113 can be configured to send a verification successful notification. In some embodiments, the verification agent 113 sends the verification successful notification to the authentication agent 139 upon successfully verifying a predefined number of authentication responses 126. In some embodiments, the verification agent 113 can send the verification successful notification to a client application 153 of a client device 106. The client application 153 can be configured to send the verification successful notification to a user interface 156 on the client device 106. After block 536, the sequence diagram of FIG. 5 ends.

Figure 6:
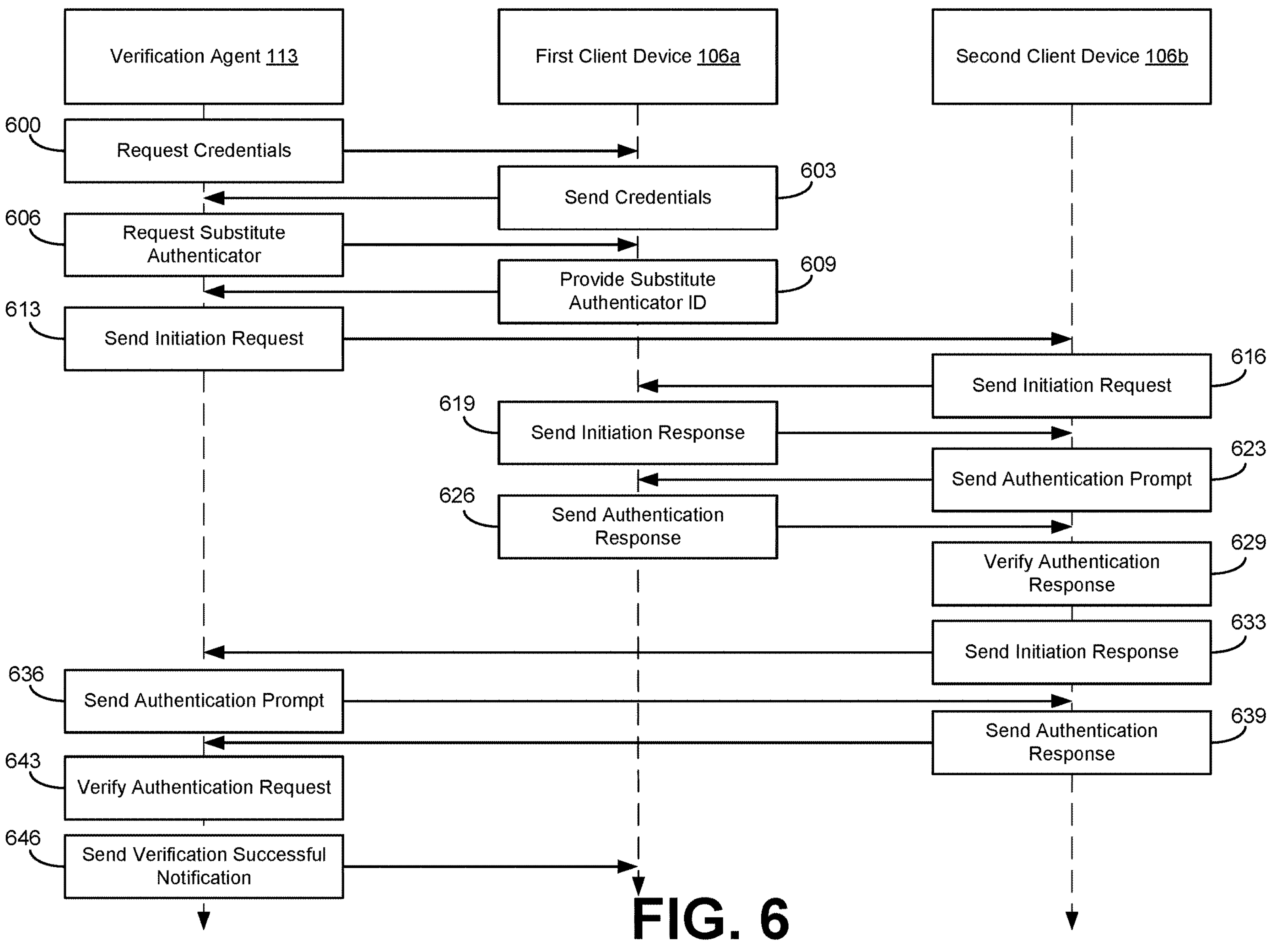
FIG. 6 is a sequence diagram illustrating interactions between various components of the network environment of FIG. 1 according to various embodiments of the present disclosure.

In FIG. 6, shown is a sequence diagram that provides one example of the operation of the interactions between the verification agent 113, a first client device 106*a*, and a second client device 106*b*. The sequence diagram of FIG. 6 provides merely an example of the many different types of potential interactions between the verification agent 113, a first client device 106*a*, and a second client device 106*b*. As an alternative, the sequence diagram of FIG. 6 can be viewed as depicting an example of elements of a method implemented within the network environment 100.

Beginning with block 600, the verification agent 113 can be configured to request credentials. In some embodiments, the verification agent 113 can send a request for credentials to a first client device 106*a* through the network 109. In some embodiments, the verification agent 113 can send a request for credentials to a client application 153 on the first client device 106*a*. According to various examples, the client application 153 can be configured to generate a prompt on the user interface 156 of the first client device 106*a* requesting credentials from a user. In some examples, the request for credentials can be sent in response to the verification agent 113 receiving a request for access.

At block 603, the first client device 106*a* can send credentials to the verification agent 113. In some embodiments, the credentials are received by the first client device 106*a* from a user input to the user interface 156. The first client device 106*a*, in some examples, can obtain the credentials from a data store 143 or client data store 159 to send to the verification agent 113.

At block 606, the verification agent 113 can be configured to request a substitute authenticator. According to various examples, the verification agent 113 can request a substitute authenticator after failing to identify a user account associated with the credentials. In some examples, the verification agent 113 requests a substitute authenticator after failing to identify a private text corpus 119 associated with the user account identified by the credentials. In some embodiments, the request for a substitute authenticator is sent to the first client device 106*a*.

At block 609, the first client device 106*a* can be configured to provide a substitute authenticator identification. In some examples, the first client device 106*a* provides a substitute authenticator identification in response to the request for a substitute authenticator received at block 606. In some embodiments, the first client device 106*a* can obtain the substitute authenticator identification from a data store 143, a client data store 159, a user input via the user interface 156, or from another service, data store, or device in the networked environment 100. In some examples, the substitute authenticator identification can be a telephone number, an account number, a name, a username, a device identifier, or other form of identification for the substitute authenticator.

Moving to block 613, the verification agent 113 can be configured to send an initiation request to a second client device 106*b* associated with the substitute authenticator. In some examples, the verification agent 113 can identify the user account associated with the substitute authenticator identification provided at block 609. The verification agent 113 can obtain the private text corpus 119 associated with the substitute authenticator's user account. According to various examples, the verification agent 113 can obtain the private text corpus 119 from a data store 143. In some embodiments, the initiation request can include information about the first client device 106*a*. The initiation request can be a prompt sent to an authentication agent 139 on the second client device 106*b* to establish a communication channel between the verification agent 113 and the authentication agent 139. This communication channel can be used to facilitate an interactive authentication session between the verification agent 113 and the authentication agent 139. In some embodiments, the initiation request can include information identifying the verification entity and/or identifying the private text corpus 119 which will be referenced for authentication.

At block 616, the second client device 106*b* can be configured to send an initiation request to the first client device 106*a*. The second client device 106*b* can identify the first client device 106*a* based at least in part on the initiation request received from the verification agent 113 at block 613. The initiation request can be a prompt sent to an authentication agent 139 on the first client device 106*a* to establish a communication channel between the authentication agent 139 of the first client device 106*a* and the authentication agent 139 of the second client device 106*b*. In some embodiments, the initiation request can include information identifying the second client device 106*b* and/or identifying the private text corpus 119 which will be referenced for authentication.

At block 619, the first client device 106*a* can be configured to send an initiation response to the second client device 106*b*. According to various examples, the first client device 106*a* can be configured to send the initiation response in response to receiving the initiation request at block 616. The initiation response can comprise an indication that the authentication agent 139 of the first client device 106*a* is ready to engage in an authentication process.

Next, at block 623, the second client device 106*b* can be configured to send an authentication prompt 123. In some embodiments, the second client device 106*b* can generate the authentication prompt 123 using an authentication model 136. The authentication prompt 123 can be generated by the authentication agent 139 based at least in part on the private text corpus 119 and/or other user data 146 shared with the first user. In various examples, the authentication prompt 123 can be in the form of a natural language question. In some embodiments, the second client device 106*b* can send multiple authentication prompts 123 at once or in sequence. In some embodiments, the second client device 106*b* can send one authentication prompt 123, and in response to receipt of an authentication response 126, send another authentication prompt 123.

At block 626, the authentication agent 139 of the first client device 106*a* can be configured to send an authentication response 126 to the second client device 106*b*. The first client device 106*a* can generate an authentication response 126. In various examples, the authentication agent 139 can generate the authentication response 126 in response to receiving the authentication prompt 123 from the verification agent 113. The authentication agent 139 can be configured to generate the authentication response 126 using the authentication model 136. The authentication response 126 can be generated by the authentication agent 139 based at least in part on the private text corpus 119 and/or other user data 146. In various examples, the authentication response 126 can be in the form of a natural language answer. The authentication agent 139 can be configured to generate multiple authentication responses 126 at the same time, in sequence, or iteratively generate a new authentication response 126 in response to receiving a new authentication prompt 123. The authentication agent 139 can be configured to send the authentication response 126. The authentication agent 139 can send the authentication response 126 over the network 109 to the verification agent 113. In some embodiments, the authentication agent 139 can send multiple authentication responses 126 at once or in sequence. The authentication agent 139 can be configured to send multiple authentication responses 126 at the same time, in sequence, or iteratively send a new authentication response 126 in response to receiving a new authentication prompt 123.

Moving to block 629, the second client device 106*b* can be configured to verify the authentication response 126 sent at block 626 by comparing the authentication response 126 to an expected response 133. According to various examples, the second client device 106*b* can generate an expected response 133 in response to generating an authentication prompt 123 as discussed at block 623. The second client device 106*b* can generate the expected response 133 based at least in part on the private text corpus 119 and/or the user data 146 by using the authentication model 136. The second client device 106*b* can use the authentication model 136 to compare the authentication response 126 to the expected response 133. In some examples, if the match between authentication response 126 and the expected response 133 surpasses a predefined threshold, the authentication response 126 is verified. According to various examples, once the second client device 106*b* has verified a predefined number of authentication responses 126, the first user is then verified.

At block 633, the second client device 106*b* can be configured to send an initiation response to the verification agent 113. According to various examples, the second client device 106*b* can be configured to send the initiation response in response to verifying the first user at block 629. The initiation response can comprise an indication that the authentication agent 139 of the second client device 106*b* is ready to engage in an authentication process.

Next, at block 636, the verification agent 113 can be configured to send an authentication prompt 123. In some embodiments, the verification agent 113 can generate the authentication prompt 123 using a verification model 129. The authentication prompt 123 is generated by the verification agent 113 based at least in part on the private text corpus 119 and/or other user data 146 shared with the substitute authenticator. In various examples, the authentication prompt 123 can be in the form of a natural language question. The verification agent 113 can send the authentication prompt 123 to the authentication agent 139 on the second client device 106*b*. In some embodiments, the verification agent 113 can send multiple authentication prompts 123 at once or in sequence. In some embodiments, the verification agent 113 can send one authentication prompt 123, and in response to receipt of an authentication response 126, send another authentication prompt 123.

Next, at block 639, the authentication agent 139 of the second client device 106*b* can be configured to send an authentication response 126. The authentication agent 139 can generate an authentication response 126. In various examples, the authentication agent 139 can generate the authentication response 126 in response to receiving the authentication prompt 123 from the verification agent 113. The authentication agent 139 can be configured to generate the authentication response 126 using the authentication model 136. The authentication response 126 can be generated by the authentication agent 139 based at least in part on the private text corpus 119 and/or other user data 146 shared with the substitute authenticator. In various examples, the authentication response 126 can be in the form of a natural language answer. The authentication agent 139 can send the authentication response 126 over the network 109 to the verification agent 113. In some embodiments, the authentication agent 139 can send multiple authentication responses 126 at once or in sequence. The authentication agent 139 can be configured to send multiple authentication responses 126 at the same time, in sequence, or iteratively send a new authentication response 126 in response to receiving a new authentication prompt 123.

At block 643, the verification agent 113 can be configured to verify the authentication response 126 by comparing the authentication response 126 to an expected response 133. According to various examples, the verification agent 113 can generate an expected response 133 in response to generating an authentication prompt 123 as discussed at block 636. The verification agent 113 can generate the expected response 133 based at least in part on the private text corpus 119 and/or the user data 146 shared with the substitute authenticator by using the verification model 129. The verification agent 113 can use the verification model 129 to compare the authentication response 126 to the expected response 133. In some examples, if the match between authentication response 126 and the expected response 133 surpasses a predefined threshold, the authentication response 126 is verified. According to various examples, once the verification agent 113 has verified a predefined number of authentication responses 126, the substitute authenticator is then verified. In some embodiments, once the substitute authenticator is verified, then the verification agent 113 can verify the first user.

At block 646, the verification agent 113 can be configured to send a verification successful notification. In some embodiments, the verification agent 113 sends the verification successful notification to the second client device 106*b* and/or the first client device 106$a$ upon successfully verifying a predefined number of authentication responses 126 from the second client device 106$b$. In some embodiments, the verification agent 113 sends the verification successful notification to a client application 153 of the first client device 106$a$. The client application 153 can be configured to send the verification successful notification to a user interface 156 on the first client device 106$a$. After block 646, the sequence diagram of FIG. 6 ends.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
- a computing device comprising a processor and a memory; and
- machine-readable instructions stored in the memory that, when executed by the processor, cause the computing device to at least:
  - obtain a private text corpus associated with a user account, the private text corpus being shared between the user account and a verification agent associated with the computing device;
  - generate at least one authentication prompt using a large language model, the large language model being trained at least in part on the private text corpus;
  - send the at least one authentication prompt to an authentication agent associated with the user account, wherein the authentication agent is fine-tuned based at least in part on the private text corpus and is trained to identify a parsed term in the at least one authentication prompt;
  - receive, from the authentication agent, an authentication response, the authentication response being based at least in part on the parsed term, the at least one authentication prompt, and the private text corpus; and
  - verify the authentication response based at least in part on the private text corpus.

2. The system of claim 1, wherein the machine-readable instructions which cause the computing device to obtain the private text corpus further cause the computing device to at least:
- receive a request for access from a client device, the request for access comprising at least one user credential;
- identify the user account associated with the client device based at least in part on the at least one user credential; and
- obtain, from a data store, the private text corpus associated with the user account.

3. The system of claim 2, wherein the machine-readable instructions further cause the computing device to at least grant access to the client device upon successful verification.

4. The system of claim 1, wherein the machine-readable instructions further cause the computing device to at least send, to a client device associated with the user account, a notification that verification was successful.

5. The system of claim 1, wherein the machine-readable instructions further cause the computing device to at least:
- send an initiation request to the authentication agent, the initiation request identifying the verification agent;
- receive an initiation response from the authentication agent; and
- in response to receiving the initiation response, send the at least one authentication prompt to the authentication agent.

6. The system of claim 1, wherein the machine-readable instructions which cause the computing device to verify the authentication response further cause the computing device to at least:
- generate an expected response to the at least one authentication prompt using the large language model; and
- compare the authentication response to the expected response.

7. The system of claim 1, wherein the private text corpus is shared between a client device associated with the user account and the verification agent.

8. A method, comprising:
- sharing, by a client device, a private text corpus with a verification service hosted by a verification agent;
- training, by the client device, a large language model based at least in part on the private text corpus;
- incorporating, by the client device, the large language model into an authentication agent associated with the client device; and
- training the authentication agent to identify a parsed term in an authentication prompt and to generate an authentication response to an authentication prompt using at least a parsed term and the large language model.

9. The method of claim 8, further comprising:
- receiving, by the client device, a request to configure automatic authentication;
- in response to receiving the request to configure automatic authentication, sending, by the client device, a request for the large language model; and
- receiving, by the client device, the large language model.

10. The method of claim 8, wherein training the large language model further comprises:
- converting, by the client device, the private text corpus into a plurality of vector embeddings;
- storing, by the client device, the plurality of vector embeddings in a vector database; and
- augmenting, by the client device, the large language model with the vector database.

11. The method of claim 8, further comprising:
- encrypting, by the client device, the large language model; and
- saving, by the client device, the large language model to a local storage location on the client device.

12. The method of claim 11, further comprising:
- receiving, by the client device, an authentication initiation request;

sending, by the client device, a decryption notification to a user interface of the client device;

receiving, by the client device, a decryption input; and in response to receiving the decryption input, decrypting, by the client device, the authentication agent.

13. The method of claim 8, wherein training the large language model further comprises fine-tuning, by the client device, the large language model based at least in part on the private text corpus.

14. The method of claim 8, wherein the private text corpus is shared between a user account and the verification agent.

15. A non-transitory, computer-readable medium, comprising machine-readable instructions that, when executed by a processor of a computing device, cause the computing device to at least:

obtain a private text corpus associated with a verification agent, the private text corpus being shared between the verification agent and a user account associated with the computing device;

receive at least one authentication prompt from a verification service hosted by the verification agent;

identify a parsed term from the authentication prompt;

generate an authentication response corresponding to the at least one authentication prompt using an authentication agent, wherein the authentication agent generates the authentication response based at least in part on the parsed term, the authentication prompt, and a large language model, the large language model being trained at least in part on the private text corpus; and send the authentication response to the verification service.

16. The non-transitory, computer-readable medium of claim 15, wherein the machine-readable instructions which cause the computing device to obtain the private text corpus further cause the computing device to at least:

receive a request for credentials from the verification service, the request for credentials identifying the verification agent; and identify the private text corpus associated with the verification agent.

17. The non-transitory, computer-readable medium of claim 15, wherein the machine-readable instructions, when executed, further cause the computing device to at least receive a notification that verification was successful.

18. The non-transitory, computer-readable medium of claim 15, wherein the machine-readable instructions, when executed by the processor, further cause the computing device to at least:

receive an initiation request from the verification agent;

decrypt the large language model; and upon decryption of the large language model, send an initiation response, the initiation response indicating that the large language model is ready for authentication.

19. The non-transitory, computer-readable medium of claim 18, wherein the machine-readable instructions which cause the computing device to decrypt the large language model further cause the computing device to at least:

send a decryption notification to a user interface; and receive a decryption input via the user interface.

20. The non-transitory, computer-readable medium of claim 18, wherein the machine-readable instructions which cause the computing device to decrypt the large language model further cause the computing device to at least obtain a decryption input from a data store.

* * * * *